United States Patent [19]

Sims et al.

[11] 3,924,018

[45] Dec. 2, 1975

[54] WHIPPED TOPPINGS

[75] Inventors: Rex J. Sims, Pleasantville; Harold D. Stahl, Hartsdale, both of N.Y.

[73] Assignee: General Foods Corporation, White Plains, N.Y.

[22] Filed: June 14, 1974

[21] Appl. No.: 479,325

[52] U.S. Cl. ............................................... 426/564
[51] Int. Cl.² ............................................... A23L 1/00
[58] Field of Search ............ 426/98, 163, 201, 363, 426/564

[56] References Cited
UNITED STATES PATENTS

| | | | |
|---|---|---|---|
| 2,786,765 | 3/1957 | Prince | 426/163 |
| 3,098,748 | 7/1963 | Noznick et al. | 426/98 |
| 3,353,965 | 11/1967 | Patterson | 426/163 |
| 3,434,848 | 3/1969 | Katz | 426/363 |
| 3,597,233 | 8/1971 | Patterson | 426/163 |

*Primary Examiner*—Jeanette M. Hunter
*Attorney, Agent, or Firm*—Bruno P. Struzzi; Daniel J. Donovan; Thaddius J. Carvis

[57] ABSTRACT

A dry, low-pH whipped topping mix, containing a fat encapsulated in a carbohydrate and employs an emulsifier system comprising a major amount of a first, strongly-hydrophilic, but pH-sensitive emulsifier and a minor amount of a second, pH-insensitive emulsifier. The dry topping mix can also include an edible acid. Rehydration and acidification of the dry topping mix causes controlled destabilization of the emulsion for effective whipping.

25 Claims, No Drawings

WHIPPED TOPPINGS

BACKGROUND OF THE INVENTION

The present invention relates in general to whipped toppings, and more particularly, to a dry, low-pH whipped topping mix, a high quality low-pH whipped topping, and methods for preparing these products.

It has long been recognized that fresh dairy cream can be whipped to provide delicious whipped toppings for desserts and other foods. However, because of its protein content, natural cream cannot be whipped at acid pH. And, because cream is relatively perishable and must be stored under refrigeration, the art has endeavored to provide suitable substitutes.

There are presently known a wide variety of whipped cream substitutes, usually prepared from oil-in-water emulsions. Some of these are available as dried powders for convenient storage and handling, but none are for forming high quality whipped toppings at low pH.

Experience has shown that it is extremely difficult to obtain an emulsion which, if stable enough to be dried, will then be capable of whipping to provide a topping having a consistency and mouthfeel of real whipped cream. Typically, successful products of this type must contain protein and/or hydrocolloids to provide stability for drying. And, even where proteins are not required for drying, it is usually necessary to employ a protein, such as from milk, to obtain a suitable whip. Because the proteins of this type coagulate at low pH, it would be advantageous to have a product which does not require protein.

In an article in *Food Technology*, W. H. Kinghtly (Vol. 22, 731–744, pages 73 through 86, June 1968) discusses the preparation of non-dairy whipped toppings. Generally, these toppings are based upon emulsified vegetable fats and contain corn syrup, sugar, water, emulsifiers, stabilizers, and flavoring and coloring materials. Most of the toppings discussed by Knightly contain protein in the form of sodium caseinate as an emulsifier and film former. Knightly suggests that these protein-containing toppings exhibit curdling and syneresis when used in or on an acid product and that the protein can be eliminated from such formulations only by the exercise of special precautions. In particular, he suggests increasing the amount of the non-proteinaceous emulsifier used or using a more hydrophilic emulsifier. He also suggests increasing the relative amounts of sugar and stabilizers to provide added body to the toppings. However, while these suggestions may help mitigate localized curdling or syneresis when the topping is in contact with an acid medium, they may lead to a topping of gummy texture and do not provide any guidance toward the preparation of an acid or low-pH topping, especially a dry, low-pH topping mix.

In U.S. Pat. No. 3,514,298 to Noznick et al. there is a further discussion of the preparation of protein-free toppings. Noznick et al. disclose the preparation of aqueous emulsions of a carbohydrate and fat by employing a partial ester of a higher fatty acid and a polyglycerol. Noznick et al. state that their protein-free emulsions can be spray dried; however, there is no indication that these emulsions are capable of forming good quality low-pH whipped toppings.

Further exemplary of whipped toppings employing non-proteinaceous emulsifier systems is that disclosed by Prince in U.S. Pat. No. 2,786,765. Prince discloses a concentrate which can be combined with water and whipped to form a topping. The concentrate comprises sugar, water, fat and an emulsifier system comprising about one part by weight of sorbitan monostearate per 15 parts by weight of fat and an extremely small amount of sodium stearate (i.e., about 0.06%). The concentrate disclosed by Prince cannot be dried at elevated temperatures and will not give a good quality whipped topping at low-pH.

Thus, there is a need for a dry, low-pH topping mix which is capable of producing a high quality whipping topping. And, to our knowledge, there is no prior art process or composition capable of providing a low-pH whipped topping mix capable of providing a topping of suitable consistency and mouthfeel.

SUMMARY OF THE INVENTION

Accordingly, it is an object of the present invention to provide a dry, low-pH whipped topping mix and a method for preparing the same which assure the production of high quality whipped toppings.

It is another object of the present invention to provide a low-pH whipped topping having the consistency and mouthfeel characteristic of natural whipped cream.

It is a further object of the present invention to provide a method for preparing a composition which can be mixed with a low-pH liquid to obtain a low-pH whipped topping having characteristics very similar to those of whipped cream.

It is a still further object of the present invention to provide a dry topping mix which can be mixed with a low-pH liquid and whipped to provide a topping having the characteristic texture and mouthfeel of natural whipped cream.

It is yet another object of the present invention to provide a method for preparing a low-pH whipped topping, having the characteristic texture and mouthfeel of natural whipped cream.

These and other objects are accomplished according to the present invention which provides a dry, low-pH whipped topping mix, a low-pH whipped topping, and methods for preparing these products. Central to the present invention is the discovery of a narrowly defined emulsifier system which, when employed in a carbohydrate-fat system, allows for the production of a highly stable emulsion which can be dried for storage and transportation, and can be admixed with an acid to provide, when rehydrated, a whipped topping which is unusually similar in characteristics to natural whipped cream.

DETAILED DESCRIPTION OF THE INVENTION

The compositions of the present invention do not require proteinaceous materials of any kind as emulsifiers or stabilizers; however, where the protein is soluble at acid pH, such as cottonseed protein or hydrolyzed protein, it can be employed if desired. Proteins such as milk protein cannot be employed in the novel products at a low pH without curdling.

The present invention employs oil-in-water emulsions containing a carbohydrate dissolved in the continuous water phase. These emulsions are dried, such as by spray or drum drying, to provide a dry powder comprising the fat encapsulated in a matrix of the carbohydrate. This dry powder can then be admixed with an acid, rehydrated, and whipped to provide a whipped topping of superior texture and mouthfeel. The acid can be added as a dry powder or as a liquid, such as orange juice or vinegar.

The nature of the fat is not critical to the present invention but can be selected from any number of fats or oils available. It is noted, however, that a fat having a high solids content at the proposed whipped temperature and a rapid meltdown to a low solids content at body temperature is important for acceptable mouthfeel. The usual topping fats of coconut origin are acceptable. For example, coconut oil which has been hydrogenated to have a melting point of about 90°F – 94°C is suitable. Further exemplary of other fats which can be employed according to the present invention are those of vegetable origin, such as hydrogenated cottonseed oil, hydrogenated corn oil, hydrogenated or hydrogenated and fractionated soybean oil, hydrogenated palm kernel oil, hydrogenated peanut oil, hydrogenated olive oil, etc. This list is by no means exhaustive, but merely exemplary of materials which may be readily employed by those skilled in the art. The particular fat is limited only to the use of edible fats which provide the desired working characteristics and mouthfeel.

A wide variety of carbohydrates can be employed in the present invention. The principal criteria for selection of the carbohydrate are that it be compatible with the emulsifier system of the present invention and that it produce stable emulsions which can be efficiently dried. Within these guidelines, the sweetness of the final whipped topping may be varied over a wide range depending upon the selection of a particular carbohydrate. Exemplary of the carbohydrates which can be employed are corn syrups with D.E. values which would allow emulsion stability and drying at elevated temperatures. For example, those having D.E. values of 24 to 60, and low contents of higher polymeric materials are suitable. The higher polymeric materials produce unstable emulsions—apparently due to the complexing of these materials with the ionic emulsifier. In addition, the corn syrup should be low enough in dextrose content so that it will dry readily in a spray or drum dryer and produce a product that is essentially non-hygroscopic. A particularly suitable corn syrup used according to the present invention is one having a D.E. value of 43 which contains about 5% dextrose, 48% maltose, 14.5% trisaccarides and 32.5% tetra and higher saccarides which is available from Corn Products as Mor-Sweet 1435. Other suitable carbohydrates which can be employed according to the present invention are those as described in the above noted U.S. Pat. No. 3,514,298 to Noznick et al.

In general, to prepare a dry powder from an emulsion of the type discussed above, it is necessary to employ a relatively large amount of at least one strongly hydrophilic emulsifier. Without the strongly hydrophilic emulsifier, the stability necessary for drying the emulsion such as by spray or drum drying would be difficult to obtain.

Of the many theories on emulsion stability, the one on electrical or charge stabilization appears the easiest to understand. Charges surrounding oil droplets can arise via: ionization, adsorption or frictional contact. In our case the emulsion is stabilized by an ionic emulsifier. The carboxylic end of the emulsifier projects into water phase and is ionized to some degree. The (COO$^-$) grouping thus forms an effective coating of negative charges around the oil droplet. When one of these highly charged droplets approaches another, repulsive forces arise which prevent its close approach and coalescence. This is one prime reason why ionic emulsifiers produce shelf stable liquid emulsions. A further consequence is the exceptional heat stability of these emulsions which show little or no oil separation upon prolonged boiling. The added thermal energy is still not sufficient to cause significant coalescence. This is a principal reason why these emulsions can be spray dried without the presence of other stabilizers such as protein or gums.

However, the fact that we can prepare highly stable oil-in-water emulsions alone does not advance the technology of whipped toppings. These highly stable emulsions may be useful as clouds, coffee, lighteners and milks but do not whip well.

It has been noticed in practice that where amounts of these emulsifiers sufficient for drying are used, the whipping characteristics of the emulsion, in the absence of protein or other stabilizers, are deficient in one or more respect. First, when it is desired to form a topping at neutral pH the topping simply lacks body or the ability to peak as is found in natural whipped cream. Secondly, upon acidification, as by the addition of fruit, where a pH sensitive emulsifier is employed, the emulsion is destabilized and the topping takes on a dry, greasy, heavy-bodied mouthfeel, which more nearly resembles cake icing than whipped cream in texture and mouthfeel.

A principal feature of the present invention is the discovery that while a relatively large amount of the strongly hydrophilic emulsifier is necessary for proper drying, controlled destabilization of the emulsion is necessary to obtain the desired whipped-cream-like characteristics in the final topping. It has been found according to the present invention that this can be achieved by employing an emulsifier system comprising a major amount of a first, pH-sensitive, strongly-hydrophilic emulsifier and a minor amount of a second, pH-sensitive emulsifier.

The first emulsifier which initially provides stability for drying, is acted upon, after rehydration in an acid environment, to partially destabilize the emulsion and thereby allow agglomerated fat to surround the air bubbles and provide structural strength to the topping. Without these fat agglomerates, the air cells would tend to coalesce and subsequently collapse. The first emulsifier is employed in an amount of from about 1.0% to about 10% based on the dry weight of the ingredients.

The degree of destabilization is, however, controlled by the second emulsifier. Because of the presence of the second emulsifier, destabilization is allowed to occur only to the extent necessary to obtain sufficient agglomerates to provide the desired structural strength to the whipped topping, while preventing complete destabilization of the emulsion with its attendant undesirable effects on the texture and mouthfeel. The second emulsifier is employed in an amount of from about 0.5 to 5% based on the dry weight of the ingredients.

The first emulsifier is necessarily one which is soluble or dispersible in water at neutral pH and insoluble at acid pH. Preferably, the emulsifier is an anionic emulsifier which is strongly hydrophilic at neutral pH, but relatively hydropobic at pH values of below about 4.5. These properties enable the preparation and drying of stable aqueous emulsions at neutral pH, and further enable rapid redispersion of the dried emulsion in cold water and then destabilization upon acidification.

A wide variety of anionic emulsifiers can be employed as the first emulsifier according to the present invention. Particularly preferred among these are the class of emulsifiers defined as the soluble sodium or potassium salts of fatty acid esters of a polyol esterified with a di- or tri- carboxylic food acid. The polyol can be glycerol, propylene glycol, a polyglycerol, or 1,3-butylene glycol. Typical of this class of emulsifiers is Myverol SMG succinoylated monoglycerides available from Eastman Chemical Co. Further exemplary of this class of emulsifiers are diacetyl tartaric acid esters of mono- and diglycerides, citric acid esters of mono- and diglycerides and steroyl propylene glycol hydrogen succinate. Another suitable class of emulsifiers includes the sodium and potassium salts of fatty alcohol esters of di- or tri-carboxylic food acids. Typical of these emulsifiers is sodium stearyl fumarate. A further group of suitable emulsifiers which may be used as the first emulsifier according to the present invention are the sodium and potassium salts of fatty acid esters of hydroxy carboxylic food acids. Representative of these emulsifiers is sodium stearoyl-2-lactylate. Additionally, the inorganic polyfunctional acid esters of mono and di-glycerides, such as phosphated mono and diglycerides, can be employed as the first emulsifier according to the present invention.

The second emulsifier employed in the emulsifier system of the present invention is an emulsifier which is unaffected by lowering the pH to acid levels. Accordingly, when the addition of acid to the emulsion reduces the hydrophile/lipophile balance of the first emulsifier, the presence of the second emulsifier controls the destabilization to occur to no greater than the desired degree. Particularly desirable for use as the second emulsifier are nonionic emulsifiers such as polysorbate 60, available as Drewpone 60 from Drew Chemical Co. Also suitable are the sodium salts of sulfoacetate esters of mono- and diglycerides which are available commercially from Witco Chemical Co. as Emargol. Other emulsifiers which may be employed according to the present invention are decaglycerol monostearate, decaglycerol distearate, and propylene glycol monostearate. The selection of any particular one from this group of emulsifiers is largely a matter of choice, it being necessary only that it can be employed in amounts sufficient to adequately control the rate of destabilization of the emulsion and that it not interact adversely with the other components of the system.

While the precise operable limits of the amount of the first and second emulsifiers relative to each other and to the total composition will vary depending upon the relative effectiveness of the emulsifiers, their respective molecular weights, and the amount of acid employed in the whipping composition, it can be said with a reasonable degree of precision that the emulsifier system should be present in amounts ranging from about 1.5 to about 15% and preferably from about 3 to about 10%, based on the total weight of the dry ingredients. Generally, the first emulsifier and the second emulsifier are present at a weight ratio of from about 15:1 to about 1:1 preferably from about, 12:1 to about 2:1. At lower pH values, the total amount of the emulsifier system employed will tend toward the upper limit of the stated ranges, and the ratio of first to second emulsifier will tend toward the higher ratios.

Other ingredients may also be included in the composition of the present invention such as flavorants, colorants or dyes, vitamins, minerals and the like.

In general, the process of the present invention includes blending the fat, carbohydrate, water and emulsifier system; establishing a stable oil-in-water type emulsion, with the fat as the discontinuous phase and an aqueous solution containing the carbohydrate as the continuous phase; and drying the emulsion to thereby encapsulate the fat within a matrix of the carbohydrate and form a dry, free-flowing powder suitable for convenient storage and/or shipment. To whip the emulsion it is necessary to add an amount of an acid effective to partially destabilize the emulsion upon rehydration, redisperse the carbohydrate-encapsulated fat in water, and whip to obtain the final topping.

In preparing the emulsion, it is generally preferred that the first and second emulsifiers be first dispersed in the requisite amount of water for forming the emulsion. The water is generally present in an amount of from about 25% to about 90% based on the total weight of the emulsion. Where the first emulsifier is available in the acid form, such as Myverol SMG succinylated monoglycerides, it is necessary to form the sodium or potassium salt thereof by the addition of a suitable neutralizing medium. A desirable procedure for accomplishing this is to add the emulsifier with a slight excess of sodium carbonate to neutralize it.

While the order of addition of the two emulsifiers is not critical, it is preferred that the first emulsifier be added first, and neutralized if necessary, before the addition of the second emulsifier. The water containing the emulsifiers is then mixed with from about 10% to about 70%, based on the weight of the emulsion, of the carbohydrate under suitable mild heating, typically at about 40°C to about 60°C. This mixture is then vigorously mixed for a period of from about 1 to 2 minutes. The fat, generally from about 10% to about 70%, based on the weight of the emulsion, is heated to the temperature of the emulsifier-containing, water-carbohydrate solution and admixed therewith. Preferably, in both the emulsion and the dry topping mix the fat and carbohydrate are present at a weight ratio of from about 1:7, more preferably from about 1:2 to about 2:1.

The admixture is then vigorously agitated for from about 5 to 10 minutes to obtain a stable emulsion. Agitation may be accomplished by any suitable means such as a blender of the ordinary home type, or any other suitable high shear device capable of emulsification. A preferred method for emulsifying includes passing the blended ingredients through a homogenizer of the typical dairy type. Homogenization can be accomplished in one stage or two. The homogenization pressure for the first stage should be within the range of from about 1500 to 8000 psi. If a second stage is employed, the pressure in that stage should be within the range of from about 500 to about 1500 psi. For spray drying, second stage homogenization can be omitted.

After emulsification, the emulsion is dried as by spray or drum drying. For efficient spray drying, the emulsion should generally contain from about 25% to about 50% of water based on the total weight of the emulsion. The emulsion is heated to a temperature within the range of from about 50°C to about 80°C, and preferably of about 60°C. The emulsion is sprayed counter current to a stream of drying air to yield a fine powder comprising fat encapsulated in the carbohydrate. For drum drying, the emulsion should desirably contain from about 25% to about 40% by weight of water. The emulsion is heated and fed to a drum dryer to obtain fine flakes comprising fat encapsulated in the carbohydrate.

The carbohydrate encapsulated fat can be marketed in this form for admixture with an acid medium such as a fruit juice, or it can be admixed with a dry acid for admixture with water or other near-neutral-pH liquid. In the dried form, the carbohydrate encapsulated fat can be easily stored, transported and handled to facilitate packaging and sale for commercial and home use. This dry topping mix has an extremely good shelf life and needs no special precaution for storage except for avoiding excessively high humidity or temperature conditions. It has greater heat stability than mixes containing protein, being better able to withstand low and high temperatures: having a tolerance of at least from about 32° to about 140°F.

When it is desired to market the low-pH topping mix as the dried, carbohydrate-encapsulated fat, without the addition of dry acid, the recipe would call for simply dispersing the powder in an acid medium and aerating. According to this embodiment, the liquid used to redisperse the powder can be an acid-containing medium, or an acid can be added thereto, such as in the form of a powdered fruit juice mix. Preferred acid liquids include fruit juices such as orange and lemon juices to provide dessert and salad whipped toppings, as well as vinegar solutions to obtain whipped toppings for salads and the like. Typical of the dry powdered fruit juice mixes which can be employed are Tang orange-, grape- or grapefruit-flavored instant breakfast drink mixes. The acid is preferably present in an amount sufficient to bring the pH of the final whip to below about 5.0, preferably below about 4.5.

When it is desired to employ the dried topping mix with a dry, powdered acid incorporated therein, the acid is simply dry blended with the carbohydrate-encapsulated fat. Any of the edible acids commonly employed in dry food products can be employed according to this embodiment of the present invention. Typical of these are the food acids such as adipic, tartaric, citric, malic and fumaric acids.

In preparing the whipped topping from the dry mix, from about 50% to about 90%, preferably from about 65% to about 85%, of water or acidified aqueous solution, based on the total weight of the composition, is mixed with the dry mix before aerating. The whipped toppings produced according to the present invention can be aerated in known manner, such as whipping with a conventional home mixer for from about 1 to 5 minutes. Typically, the topping is whipped to an overrun of from about 100% to about 250%, and exhibits good freeze-thaw stability. Desirably, these toppings exhibit Brookfield viscosities within the range of from about 15 to 70 units, and preferably about 30 to about 50 units, as measured on a Brookfield Synchroelectric Viscometer using a 36mm T-bar spindle rotated on a helipath at 20 rpm.

The following examples are presented for the purpose of further illustrating and explaining the present invention and are not to be taken as limiting in any sense. Unless otherwise stated, all parts and percentages are by weight.

EXAMPLE I

An exemplary, dry, low-pH topping mix according to the present invention is prepared having the following formulation on a dry basis:

47% Wecobee HLWB fractionated hardened coconut oil available from Drew Chemical Co.;
3% Myverol SMG emulsifier, which is succinylated monoglycerides and is available from Eastman Chemical Co.;
0.3% sodium carbonate
0.25% Emargol sodium sulfo-acetate ester of mono- and diglycerides (50% solids) available from Witco Chemical Co.; and
49.45% Mor-Sweet 1435 high maltose corn syrup solids (43 D.E.) produced by Corn Products Corp.

The Myverol SMG emulsifier (15 g) and sodium carbonate (1.5 g) were added to 250 ml of water and heated at 60°C with stirring until all of the Myverol SMG emulsifier was neutralized and dispersed. The Emargol emulsifier (2.5 g) was then added to the aqueous phase and dispersed by stirring. Mor-Sweet 1435 corn syrup (301.5 g, 82% solids) which had previously been heated to about 60°C was admixed with the aqueous emulsifier blend. The resulting thin syrup was then added to a one quart Waring Blendor jar and mixed at high speed for about one minute. The Wecobee HLWB fat (286.5 g) was melted by heating to about 60°C. The melted fat was added to the Waring Blendor jar and mixed with the thin syrup for about 5 minutes to form a stable emulsion. The emulsion was spray dried in a Niro Portable spray drier (Nichols Engineering Research Corp.) having an inlet temperature of 175°C and an outlet temperature of about 50°C. The emulsion dried readily to give a dry topping mix as a fine white powder.

EXAMPLE II

The dry topping mix prepared in Example I was then combined with the following materials in the indicated amounts to provide a low-pH whipped topping according to the present invention:

45 g of dry topping mix;
15 g orange flavored Tang dry beverage mix; and
two-thirds cup of cold water at about 5°C.

The dry topping mix and Tang dry beverage mix were pre-blended and added to a small Sunbeam Mixmaster bowl. The cold water was then added and the mixture was whipped for three minutes at high speed. The whip had an overrun of 135% and a Brookfield viscosity of 23 (36mm T-bar spindle at 20 rpm). The whip had a good, non-greasy mouthfeel and a highly desirable cooling sensation in the mouth. The texture of the whipped topping was very similar to that of natural whipped cream. No off-flavor was noticed in the whip.

EXAMPLE III

The dry topping mix prepared in Example I is blended with the following materials in the proportions stated below to prepare a low-pH whipped topping according to the present invention:

45 g of the dry topping mix; and
two thirds cup syrup which was drained from a can of S and W brand fruit cocktail.

The above ingredients were whipped for two minutes at high speed in a small Sunbeam Mixmaster bowl. The resulting whip had an overrun of 152% and a Brookfield viscosity of 40–42 (36mm T-bar spindle at 20 rpm). The whip had a smooth texture, and good mouthfeel and body. The remaining fruit is then folded into the whipped topping to give a dessert similar to fruit and whipped cream which will remain stable for extended periods of time.

EXAMPLE IV

A dry topping mix according to the present invention and having the following composition on a dry basis was prepared:

```
47%    Wecobee HLWB fat;
 5%    Myverol SMG succinylated monoglyceride emulsifier;
 0.5%  sodium carbonate;
 1.56% Drewpone 60 emulsifier, polysorbate 60 available from
       Drew Chemical Co.; and
45.94% Mor-Sweet 1435 corn syrup solids.
```

The Myverol SMG emulsifier (25 g) and the sodium carbonate (2.5 g) were added to 250 ml of water and heated to neutralize the Myverol SMG emulsifier. The Drewpone 60 emulsifier (7.8 g) was added to the above and dispersed with mixing. The aqueous emulsifier dispersion was then mixed with 280.1 g Mor-Sweet 1435 corn syrup. The resulting thin syrup was added to a Waring Blendor and mixed for about one minute. The Wecobee HLWB fat (235 g) was melted by heating to about 60°C and then added to the Waring Blendor and mixed at high speed for about 5 minutes to obtain a stable emulsion. The emulsion was dried in a Niro spray dryer having a 190°C inlet temperature. The emulsion dried readily to give a dry topping mix in the form of a light, free-flowing powder.

EXAMPLE V

A low-pH whipped topping according to the present invention was prepared by combining the following materials in the proportions stated:

45 g of the dry topping mix prepared in Example IV;
15 g orange flavored Tang dry beverage mix; and
two-thirds cup of cold water at 5°C.

The powders were preblended, added to a small mixing bowl and whipped with the cold water for about three minutes. The whip had an overrun of 150% and a Brookfield viscosity of 35 (35mm T-bar spindle at 20 rpm). The resulting low-pH whipped topping had a good, moist mouthfeel and rapid meltdown which gave a desirable cooling sensation in the mouth.

EXAMPLE VI

A dry powder for preparing whipped toppings which employs the first but not the second emulsifier of the emulsifier system according to the present invention is prepared having the following formulation on a dry basis:

```
46.75% Wecobee HLWB fat;
 5%    Myverol SMG succinylated monoglyceride emulsifier
 0.5%  sodium carbonate; and
47.75% Mor-Sweet 1435 corn syrup solids.
```

The Myverol SMG emulsifier (25 g) and the sodium carbonate (2.5 g) were added to 200 ml of water and heated to neutralize the Myverol SMG emulsifier. The resulting dispersion was then mixed with 293 g Mor-Sweet 1435 corn syrup. The thin syrup obtained was added to a Waring Blendor and mixed for about one minute. The Wecobee HLWB fat (235 g) was then melted at 60°C, added to the Waring Blendor, and mixed at high speed for about five minutes. The resulting emulsion was then spray dried in a Niro spray dryer at an inlet temperature of 190°C. The emulsion dried readily to give a free flowing white powder.

EXAMPLE VII

A whipped topping is prepared employing the dry powder prepared in Example VI and the other following ingredients in the indicated proportions:

45 g of the powder;
15 g orange flavored Tang dry beverage mix; and
two-thirds cup of cold water 5°C.

The dry ingredients were preblended and placed into a small Sunbeam Mixmaster mixer bowl. The cold water was added and the mixture was whipped at high speed for 3 minutes. The whip had an overrun of 224% and a Brookfield viscosity of 45 (36mm T-bar at 20 rpm). It had a heavy-bodied texture and a dry greasy mouthfeel which was more closely related to that of butter cream icing than a whipped cream type topping.

EXAMPLE VIII

A dry powder for preparing whipped toppings which employs the second, but not the first emulsifier of the emulsifier system of the present invention is prepared having the following formulation on a dry basis:

```
47% Wecobee HLWB fat;
 3% Emargol sodium sulfoacetate ester of mono- and
    diglycerides (50%) active); and
50% Mor-Sweet 1435 corn syrup solids.
```

The Emargol emulsifier (30 g) was dispersed in 250 ml of water heated to about 60°C. The Mor-Sweet 1435 corn syrup (305 g) was added to the resulting dispersion and mixed for about one minute in a Waring Blendor. The fat (235 g Wecobee HLWB) was then added and the total ingredients were mixed for about 5 minutes to obtain a stable emulsion. The emulsion was spray dried.

EXAMPLE IX

The dry powder of Example VIII was evaluated for whipping properties by employing it and the other following ingredients in the following proportions:

45 g of the powder;
two-thirds cup of cold water at 5°C; and
0–0.75 g citric acid.

Whips were attempted by adding the dry powder to a Sunbeam Mixmaster bowl, adding the water, and whipping for 3 minutes at high speed. Successive amounts of citric acid were added and the overrun and viscosity measured after whipping 3 additional minutes. The results are summarized in Table I:

TABLE I

| Citric Acid (gm) | pH | Viscosity (Brookfield Units) | Overrun (%) | Texture |
|---|---|---|---|---|
| 0 | 4.3 | 1.5 | 81 | frothy liquid |
| 0.25 | 3.15 | 2.0 | 108 | " |
| 0.50 | 2.7 | 1.1 | 126 | " |
| 0.75 | 2.4 | 3.0 | 154 | " |

EXAMPLE XI

The procedures of Examples VIII and IX were repeated for a composition having the following composition by weight:

```
47%  Wecobee HLWB fat;
 3%  Myverol SMG emulsifier;
 0.3% Na_2CO_3;
```

-continued 0.25% Emargol emulsifier; and
49.45% Mor-Sweet 1435 corn syrup solids.

The preparation of the emulsion was the same as in Example VIII except that the indicated amount of Myverol SMG emulsifier is first dispersed in water and neutralized with the $Na_2CO_3$ as described in Example I and the level of the Emargol emulsifier is reduced. The whips, prepared and evaluated as described in Example IX, are summarized in Table II.

TABLE II

| Citric Acid (gm) | pH | Viscosity (Brookfield Units) | Overrun (%) | Texture |
|---|---|---|---|---|
| 0 | 6.5 | 0 | 0 | No Whip |
| 0.25 | 4.2 | 23 | 292 | Creamy whip |
| 0.50 | 3.5 | 35 | 322 | " |
| 0.75 | 3.0 | 30 | 306 | " |

Many modifications and variations of the present invention will become apparent to those skilled in the art upon reading the above disclosure. It is intended, however, that all such modifications and variations be included within the scope of the invention which is defined only by the following claims.

What is claimed:

1. A dry, low-pH whipped topping mix capable of being whipped at a pH below about 5 comprising: a fat encapsulated in a matrix of a carbohydrate and including an emulsifier system comprising a major amount of a first, strongly-hydrophilic, pH-sensitive emulsifier and a minor amount of a second, pH-insensitive emulsifier.

2. A dry topping mix according to claim 1 wherein the fat and the carbohydrate are present at a weight ratio of from about 1:7 to about 7:1, and the emulsifier system is present at a level of from about 1.5 to about 15% based on the weight of the dry ingredients.

3. A dry topping mix according to claim 2 which comprises from about 3% to about 10% of the emulsifier system.

4. A dry topping mix according to claim 3 wherein the first and second emulsifiers are present at a weight ratio of from about 15:1 to about 1:1.

5. A dry topping mix according to claim 4 wherein the ratio of first to second emulsifiers is from about 12:1 to about 2:1.

6. A dry topping mix according to claim 1 which further includes an amount of a dry acid sufficient to reduce to pH of the topping to below about 5.

7. A dry topping mix according to claim 6 wherein the fat and the carbohydrate are present at a weight ratio of from about 1:7 to about 7:1 and the emulsifier system is present at a level of from about 1.5 to about 15% based upon the weight of the dry ingredients.

8. A dry topping mix according to claim 7 which comprises from about 3% to about 10% of the emulsifier system.

9. A dry topping mix according to claim 8 wherein the first and second emulsifiers are present at a weight ratio of from about 15:1 to about 1:1.

10. A dry topping mix according to claim 4 wherein the ratio of the first to second emulsifiers is from about 12:1 to about 2:1.

11. A low-pH whipped topping comprising a fat; a carbohydrate; an emulsifier system comprising a major amount of a first, strongly-hydrophilic, pH-sensitive emulsifier and a minor amount of a second, pH-insensitive emulsifier; and an amount of an aqueous acid medium; sufficient to reduce the pH of the whip to below about 5 wherein the carbohydrate is dissolved in the aqueous acid medium and forms the continuous phase of an emulsion with the fat, and wherein the emulsion has been destabilized to a degree sufficient to allow the formation of fat globules to supply a degree of ridigity to the whip.

12. A method for preparing a dry topping mix comprising:
   a. blending fat, water, carbohydrate and an emulsifier system comprising a major amount of a first, strongly-hydrophilic, pH-sensitive emulsifier and a minor amount of a second, pH-insensitive emulsifier;
   b. vigorously agitating the blended ingredients to obtain a stable emulsion; and
   c. drying the emulsion to encapsulate the fat in the carbohydrate.

13. A method according to claim 12 wherein the emulsion is drum dried.

14. A method according to claim 12 wherein the emulsion is spray dried.

15. A method according to claim 12 wherein the fat and carbohydrate are present at a weight ratio of from about 1:7 to about 7:1; wherein the emulsifier system is present in an amount of from about 1.5 to about 15%, based upon the weight of the dry indredients; and wherein the water is present in an amount of from about 25 to 90% based on the total weight of the ingredients.

16. A method according to claim 15 wherein the emulsifier system is present in an amount of from about 3% to about 10% based on the weight of the dry ingredients.

17. A method according to claim 16 wherein the first and second emulsifiers are present at a weight ratio of from about 15:1 to about 1:1.

18. A method according to claim 17 wherein the first and second emulsifiers are present at a ratio of from about 12:1 to 2:1.

19. A method of preparing a low-pH whipped topping comprising:
   a. blending fat, water, carbohydrate and from about 1.5 to about 15% of an emulsifier system comprising a major amount of a first, strongly-hydrophilic, pH-sensitive emulsifier and a minor amount of a second, pH-insensitive emulsifier;
   b. vigorously agitating the blended ingredients to obtain a stable emulsion;
   c. drying the emulsion to encapsulate the fat in the carbohydrate;
   d. rehydrating and acidifying the emulsion dried in step (c) to a pH of below about 5; and
   e. whipping the emulsion prepared in step (d).

20. A method according to claim 19 wherein: (i) the fat and carbohydrate are present at a weight ratio of from about 1:7 to about 7:1; (ii) the water in blending step (a) is present in an amount of from about 25% to about 90%, based on the weight of the total compsition; and (iii) the water in the rehydrating step (d) is present in an amount of from about 50% to about 90%, based on the weight of the total composition.

21. A method according to claim 20 wherein the emulsifier system is present in an amount of from about 3% to about 10% based on the weight of the dry ingredients.

22. A method according to claim 21 wherein the first and second emulsifiers are present at a weight ratio of from about 15:1 to about 1:1.

23. A method according to claim 22 wherein the first and second emulsifiers are present at a weight ratio of from about 12:1 to 2:1.

24. A method according to claim 23 wherein the water employed for rehydration is employed at a level of from about 65% to 85% based upon the total composition weight.

25. A method for preparing a low-pH whipped topping comprising:
 a. blending fat, water, carbohydrate and an emulsifier system comprising a major amount of first, strongly-hydrophilic but pH-sensitive emulsifier and a minor amount of a second, pH-insensitive emulsifier;
 b. vigorously agitating the blended ingredinets to obtain a stable emulsion;
 c. acidifying the emulsion to a pH of below about 5; and
 d. whipping the emulsion.

* * * * *

UNITED STATES PATENT AND TRADEMARK OFFICE
CERTIFICATE OF CORRECTION

PATENT NO. : 3,924,018
DATED : December 2, 1975
INVENTOR(S) : Rex J. Sims et al

It is certified that error appears in the above–identified patent and that said Letters Patent are hereby corrected as shown below:

On the cover page, after Inventors: change -- Harold -- to "Howard".

Signed and Sealed this

Seventh Day of September 1976

[SEAL]

Attest:

RUTH C. MASON
Attesting Officer

C. MARSHALL DANN
Commissioner of Patents and Trademarks

UNITED STATES PATENT AND TRADEMARK OFFICE
CERTIFICATE OF CORRECTION

PATENT NO. : 3,924,018
DATED : December 2, 1975
INVENTOR(S) : Rex J. Sims, Harold D. Stahl It is certified that error appears in the above–identified patent and that said Letters Patent are hereby corrected as shown below:

Title page, line 54, and Column 1, line 2, "WHIPPED

TOPPINGS" should read

--"METHOD AND COMPOSITION FOR LOW pH WHIPPED TOPPINGS"--

Signed and Sealed this

Sixth Day of December 1977

[SEAL]

Attest:

RUTH C. MASON
*Attesting Officer*

LUTRELLE F. PARKER
*Acting Commissioner of Patents and Trademarks*